Patented Feb. 1, 1938

2,107,262

UNITED STATES PATENT OFFICE 2,107,262

BEET MOLASSES FERMENTATION

David A. Legg, Terre Haute, and Noble R. Tarvin, Brazil, Ind., assignors to Commercial Solvents Corporation, Terre Haute, Ind., a corporation of Maryland No Drawing. Application July 30, 1934, Serial No. 737,575

9 Claims. (Cl. 195—44)

The present invention relates to the production of valuable products by the fermentation of beet molasses. More particularly, this invention relates to the butyl alcohol fermentation of beet molasses by means of bacteria of the general type Clostridium saccharo-acetobutylicum.

The fermentation of soluble carbohydrate mashes, in general, by means of bacteria of the group Clostridium saccharo-acetobutylicum has been disclosed in copending application U. S. Ser. No. 675,459 by J. C. Woodruff, D. A. Legg, and H. R. Stiles, filed June 12, 1933. According to the process of this application, soluble carbohydrate mashes, such as cane molasses mashes, containing ammonia nitrogen and preferably, also, degraded protein nitrogen, are fermented while controlling the acidity of the mash by the addition of alkaline neutralizing agents whereby the final hydrogen ion concentration falls within the range pH 5.0 to pH 6.2. This process gives very satisfactory yields with most soluble carbohydrate mashes, but we have found that in the case of beet molasses mashes the yields are unsatisfactorily low, in most cases sufficiently so to make the process impractical from a commercial standpoint.

In view of the unusually high nitrogenous content of beet molasses (from 4 to 5 times that of cane molasses) it was thought that an excessive concentration of nitrogenous materials might be responsible for the decreased yield. The elimination of the additional ammonia nitrogen of U. S. Ser. No. 675,459 succeeded in increasing the yield somewhat, but did not give rise to satisfactory commercial yields.

We have now made the surprising discovery that very satisfactory yields may be obtained if additional nitrogen rather than less nitrogen is employed, providing a specific type of nitrogenous nutrient is used and there is present in the mash an adequate supply of available phosphate. The type of nitrogenous nutrient which we have found to be suitable is exemplified by the meal obtained from the corn germ after the expression of oil therefrom. This material is known as corn germ meal or oil cake meal. The phosphates which are employed in conjunction with the nitrogenous nutrient may be any of the soluble non-toxic phosphates generally employed as mineral nutrients in fermentation mashes. Alkali phosphates including ammonium phosphate, soluble complex alkaline earth phosphates, and the free acid which may be termed hydrogen phosphate, are all suitable for this purpose. As specific examples there may be mentioned $(NH_4)_2HPO_4$ $Na_2HPO_4$, $K_2HPO_4$, "superphosphate" $(CaH_4(PO_4)_2.H_2O)$, and the like.

The amount of corn germ meal to be employed in any case will of course depend upon the concentration and state of degradation of the other nitrogenous material present in the mash. For example, a mash containing substantial amounts of cane molasses, or other materials containing substantial concentrations of complex nitrogenous matter, will require less additional nitrogenous nutrient than one in which beet molasses comprises substantially all of the fermentable carbohydrate. However, in general it may be said that from 1 to 4% by weight of corn germ meal, based on the weight of molasses used, will usually be found to be satisfactory. From 2–3% will generally be found to be preferable and may advantageously be employed in any mash containing beet molasses as a major source of carbohydrate. In any case, the lower economical limit of germ meal concentration may easily be determined by preliminary fermentations.

The concentration of phosphate to be employed will likewise depend upon the available phosphate in the mash. Most samples of beet molasses will be found to be deficient in suitable phosphate, but in occasional samples optimum yields may be obtained without the addition of further mineral nutrients. The amount of supplementary phosphate to be added will also depend upon the amount introduced in other materials in the mash. For example, a mixed cane and beet molasses mash will require less additional mineral nutrient than one in which beet molasses comprises substantially the whole source of carbohydrate. In general, however, it may be said that from 0.01% to 0.15% by weight of a soluble phosphate will be satisfactory. From 0.03% to 0.10% will generally be found to be preferable and may be satisfactorily employed in any mash containing beet molasses as a major component. The exact concentration to be used for optimum results may, of course, readily be determined by preliminary fermentations.

An important aspect of the fermentation of beet molasses mashes comprises the acidity control during the fermentation. We have found that the organisms of the type Clostridium saccharo-acetobutylicum generally require a more alkaline reaction for the fermentation of beet molasses mashes than for the fermentation of other soluble carbohydrate mashes. In copending application U. S. Ser. No. 675,459 it is stated that for the usual type of soluble carbohydrate mash the acidity should be controlled so that the final hydrogen ion concentration falls within the range pH 5.0 to pH 6.2. However, we have found that for mashes containing beet molasses as a major component the acidity of the fermenting mash should be maintained at a value such that the final hydrogen ion concentration falls within the range pH 5.5 to 7.0 and preferably within the range pH 5.7 to 6.5.

The usual types of beet molasses will be found to contain considerable quantities of alkaline buffering materials and to have an initial alkaline reaction ranging from pH 7.0 to pH 9.0. This degree of alkalinity is usually insufficient to adversely effect the fermentation, and the mashes may be inoculated at their original hydrogen ion concentration without the necessity for neutralizing. In fact, we have found that it is generally undesirable to attempt to neutralize the mashes with strong acids such as mineral acids. However, if the phosphate is supplied in the form of a free acid, this amount of acid is insufficient to adversely effect the fermentation; and considerable amounts of organic acids may also be introduced without undesirable results.

The alkaline buffering capacity of various samples of beet molasses will be found to differ to some extent, but in many cases it will be found to be sufficient to maintain the acidity within the necessary limits to secure the desired final hydrogen ion concentration. In the case of samples of molasses which are deficient in buffering materials, or in case unduly acidic materials are introduced into the mash, the acidity of the fermenting mash may be controlled by any of the methods disclosed in copending application Ser. No. 675,459. For example, the fermentation may be continuously or semi-continuously neutralized with soluble alkalies, or an insoluble alkaline material may be incorporated into the mash before inoculation. In any case, the necessity for the use of alkaline neutralizing materials and the amounts necessary for optimum yields may readily be determined by preliminary fermentations.

The organisms which are suitable for use in our process are the bacteria of the group *Clostridium saccharo-acetobutylicum*, which are described at length in copending application U. S. Ser. No. 675,459, referred to above. Our process is particularly adapted to fermentations by means of *Clostridium saccharo-acetobutylicum* α which is likewise described in detail in said copending application. Other members of this group of bacteria, such as *Clostridium saccharo-acetobutylicum* β and *Clostridium saccharo-acetobutylicum* γ described in copending application Ser. No. 714,633, now Patent No. 2,050,219, issued Aug. 4, 1936, may likewise suitably be employed.

Our invention may perhaps best be illustrated by the following specific examples.

*Example I*

Sterile mashes containing approximately 10% of Ohio beet molasses, with and without corn germ meal and phosphates, were inoculated with an actively fermenting culture of *Clostridium saccharo-acetobutylicum* α and incubated at 30° C. for 68 hours. The results of these fermentations are shown in the table below:

| Sugar concentration percent | Corn germ meal concentration percent | Type of phosphate | Phosphate concentration percent | Yield | |
|---|---|---|---|---|---|
| | | | | Percent of total sugar | Grams solvents per liter |
| 4.94 | 0.00 | | 0.00 | 21.1 | 10.4 |
| 5.08 | 0.00 | $(NH_4)_2HPO_4$ | 0.03 | 29.0 | 14.7 |
| 5.02 | 0.00 | $Na_2HPO_4$ | 0.10 | 29.1 | 14.6 |
| 4.98 | 0.25 | | 0.00 | 36.5 | 18.2 |
| 5.04 | 0.25 | $(NH_4)_2HPO_4$ | 0.03 | 37.5 | 18.9 |
| 5.04 | 0.25 | $Na_2HPO_4$ | 0.10 | 37.9 | 19.1 |

*Example II*

Sterile mashes containing approximately 10% of Michigan beet molasses, with and without corn germ meal and diammonium phosphate, were inoculated with an actively fermenting culture of *Clostridium saccharo-acetobutylicum* α and incubated at 30° C. for 68 hours. The results of these fermentations are shown in the table below:

| Sugar concentration percent | Corn germ meal concentration percent | Concentration of $(NH_4)_2HPO_4$ percent | Yield | |
|---|---|---|---|---|
| | | | Percent of total sugar | Grams solvents per liter |
| 5.12 | 0.00 | 0.00 | 23.8 | 12.2 |
| 5.10 | 0.00 | 0.07 | 27.5 | 14.0 |
| 5.04 | 0.25 | 0.00 | 28.9 | 14.6 |
| 5.10 | 0.25 | 0.07 | 39.6 | 20.2 |

*Example III*

A sterile mash containing 4.86% of sugar as Michigan beet molasses (from a different locality from that of Example II), 0.25% by weight of corn germ meal, and no additional phosphate was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 40.3 | 19.6 | 74.1 | 23.6 | 2.3 |

It may be seen from the above results that a full yield was obtained in this case without the addition of supplementary phosphate, indicating that this particular sample of molasses contained sufficient phosphate for this type of fermentation.

*Example IV*

Sterile mashes containing approximately 10% of Wisconsin beet molasses, with and without corn germ meal and diammonium phosphate, were inoculated with an actively fermenting culture of *Clostridium saccharo-acetobutylicum* α and incubated at 30° C. for 68 hours. The results of these fermentations are shown in the table below:

| Sugar concentration percent | Corn germ meal concentration percent | Concentration of $(NH_4)_2HPO_4$ percent | Yield | |
|---|---|---|---|---|
| | | | Percent of total sugar | Grams solvents per liter |
| 4.55 | 0.00 | 0.00 | 8.1 | 3.7 |
| 4.90 | 0.25 | 0.00 | 13.2 | 6.5 |
| 5.02 | 0.00 | 0.12 | 30.4 | 15.3 |
| 5.00 | 0.25 | 0.09 | 34.4 | 17.2 |

It may be seen from the above table that this particular sample of molasses was apparently strongly deficient in phosphate, but required little supplementary nitrogenous nutrient. It will of course be evident to those skilled in the art that samples from various sources will differ in their nutrient deficiencies and that optimum results can be most economically secured only after preliminary fermentations to determine the requirements for the particular sample.

Although our invention is illustrated by the above specific examples, it is to be distinctly understood that it is not limited to the particular materials or procedures described therein.

For example, mixed mashes containing cane molasses, hydrol, or other soluble carbohydrate, in addition to the beet molasses, may be successfully employed in this fermentation. Our process is applicable, generally, to soluble carbohydrate mashes containing beet molasses as a major component, irrespective of the remaining carbohydrate content. Likewise, it will be apparent to those skilled in the art that various nitrogenous materials are equivalent to corn germ meal in proteinaceous content and state of degradation and may be used with equal success in the present process. Various modifications of procedure may also be employed without departing from the scope of our invention. For example, if a mixed mash is to be employed, such as a mixed cane and beet molasses mash, the fermentation could suitably be started in the cane molasses and the beet molasses and supplementary nutrients added to this mash after fermentation had become sufficiently active. The applicability of the various modifications of procedure disclosed in copending application Ser. No. 675,459 will likewise be apparent to one skilled in the art. In general, it may be said that any such modifications or the use of any equivalents which would naturally occur to a skilled bacteriologist or fermentation chemist may be employed without departing from the scope of our invention.

Our invention now having been described, what we claim is:

1. In the fermentation of an essentially soluble carbohydrate mash containing beet molasses as a major component, by means of bacteria of the group *Clostridium saccharo-acetobutylicum*, the step which comprises effecting the fermentation in a mash containing corn germ meal and a soluble non-toxic phosphate.

2. In the fermentation of an essentially soluble carbohydrate mash containing beet molasses as a major component, by means of bacteria of the group *Clostridium saccharo-acetobutylicum*, the step which comprises effecting the fermentation in a mash containing from 0.1% to 0.4% of corn germ meal and from 0.01% to 0.15% of a soluble non-toxic phosphate.

3. In the fermentation of an essentially soluble carbohydrate mash containing beet molasses as a major component, by means of bacteria of the group *Clostridium saccharo-acetobutylicum*, the step which comprises effecting the fermentation in a mash containing from 0.2% to 0.3% of corn germ meal and from 0.03% to 0.10% of a soluble non-toxic phosphate.

4. In the fermentation of an essentially soluble carbohydrate mash containing beet molasses as a major component, by means of bacteria of the group *Clostridium saccharo-acetobutylicum*, the step which comprises effecting the fermentation in a mash containing corn germ meal and a soluble non-toxic phosphate, and maintaining the acidity of the fermenting mash at a value such that the final hydrogen ion concentration falls within the range pH 5.5 to 7.0.

5. In the fermentation of an essentially soluble carbohydrate mash containing beet molasses as a major component, by means of bacteria of the group *Clostridium saccharo-acetobutylicum*, the step which comprises effecting the fermentation in a mash containing from 0.1% to 0.4% of corn germ meal and from 0.01% to 0.15% of a soluble non-toxic phosphate, and maintaining the acidity of the fermenting mash at a value such that the final hydrogen ion concentration falls within the range pH 5.5 to 7.0.

6. In the fermentation of an essentially soluble carbohydrate mash containing beet molasses as a major component, by means of bacteria of the group *Clostridium saccharo-acetobutylicum*, the step which comprises effecting the fermentation in a mash containing from 0.2% to 0.3% of corn germ meal and from 0.03% to 0.10% of a soluble non-toxic phosphate, and maintaining the acidity of the fermenting mash at a value such that the final hydrogen ion concentration falls within the range pH 5.5 to 7.0.

7. In the fermentation of an essentially soluble carbohydrate mash containing beet molasses as a major component, by means of bacteria of the group *Clostridium saccharo-acetobutylicum*, the step which comprises effecting the fermentation in a mash containing corn germ meal and a soluble non-toxic phosphate, and maintaining the acidity of the fermenting mash at a value such that the final hydrogen ion concentration falls within the range pH 5.7 to 6.5.

8. In the fermentation of an essentially soluble carbohydrate mash containing beet molasses as a major component, by means of bacteria of the group *Clostridium saccharo-acetobutylicum*, the step which comprises effecting the fermentation in a mash containing from 0.1% to 0.4% of corn germ meal and from 0.01% to 0.15% of a soluble non-toxic phosphate, and maintaining the acidity of the fermenting mash at a value such that the final hydrogen ion concentration falls within the range pH 5.7 to 6.5.

9. In the fermentation of an essentially soluble carbohydrate mash containing beet molasses as a major component, by means of bacteria of the group *Clostridium saccharo-acetobutylicum*, the step which comprises effecting the fermentation in a mash containing from 0.2% to 0.3% of corn germ meal and from 0.03% to 0.10% of a soluble non-toxic phosphate, and maintaining the acidity of the fermenting mash at a value such that the final hydrogen ion concentration falls within the range pH 5.7 to 6.5.

DAVID A. LEGG.
NOBLE R. TARVIN.